(12) United States Patent
Walter et al.

(10) Patent No.: US 8,528,964 B2
(45) Date of Patent: Sep. 10, 2013

(54) BODY STRUCTURE WITH A PANE CROSS MEMBER FOR A MOTOR VEHICLE WITH A WINDSHIELD

(75) Inventors: Stephan Walter, Ringheim (DE); Uwe Schmitz, Nauheim (DE); Joachim Schaefer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/156,121

(22) Filed: Jun. 8, 2011

(65) Prior Publication Data

US 2011/0304177 A1 Dec. 15, 2011

(30) Foreign Application Priority Data

Jun. 10, 2010 (DE) .................. 10 2010 023 281

(51) Int. Cl.
*B62D 25/08* (2006.01)
(52) U.S. Cl.
USPC ..................... 296/187.04; 296/192
(58) Field of Classification Search
USPC .................. 296/187.04, 187.09, 192, 201, 70
See application file for complete search history.

(56) References Cited

U.S. PATENT DOCUMENTS

| | | | |
|---|---|---|---|
| 6,193,304 B1 | 2/2001 | Takahashi et al. | |
| 6,193,305 B1 | 2/2001 | Takahashi | |
| 7,552,964 B2 | 6/2009 | Saito | |
| 2007/0102222 A1* | 5/2007 | Tanaka ........................ | 180/291 |
| 2008/0284208 A1 | 11/2008 | Kannan et al. | |

FOREIGN PATENT DOCUMENTS

| | | |
|---|---|---|
| DE | 19921871 A1 | 11/1999 |
| DE | 102006029921 A1 | 1/2008 |
| EP | 1810892 A1 | 7/2007 |
| JP | 2004155351 A | 6/2004 |
| JP | 2007125995 A | 5/2007 |
| JP | 2007223441 A | 9/2007 |
| JP | 2007245942 A | 9/2007 |
| JP | 2008100533 A | 5/2008 |
| JP | 2010023536 A | 2/2010 |
| KR | 100906578 B1 | 7/2009 |
| KR | 20110022166 A | 3/2011 |

OTHER PUBLICATIONS

German Patent Office, German Search Report for Application No. 102010023281.5, dated Feb. 22, 2011.
British Patent Office, British Search Report for Application No. GB1108751.7 dated Sep. 15, 2011.

* cited by examiner

*Primary Examiner* — Joseph Pape
(74) *Attorney, Agent, or Firm* — Ingrassia Fisher & Lorenz, P.C.

(57) ABSTRACT

A body structure is provided for a motor vehicle with a windshield that includes, but is not limited to a pane cross member, on which the windshield rests. The pane cross member includes, but is not limited to a first and a second edge section in the form of brackets, and a central part lying there between, which has a U-shaped cross-section. The first edge section forms a support section for the windshield, the second edge section is fastened to a fixed component of the body structure and is arranged laterally from the first edge section, and the central part is constructed such that it has a cross-section which is curved in the direction towards an engine hood of the motor vehicle and can deform on application of force from above and/or from the front.

20 Claims, 2 Drawing Sheets

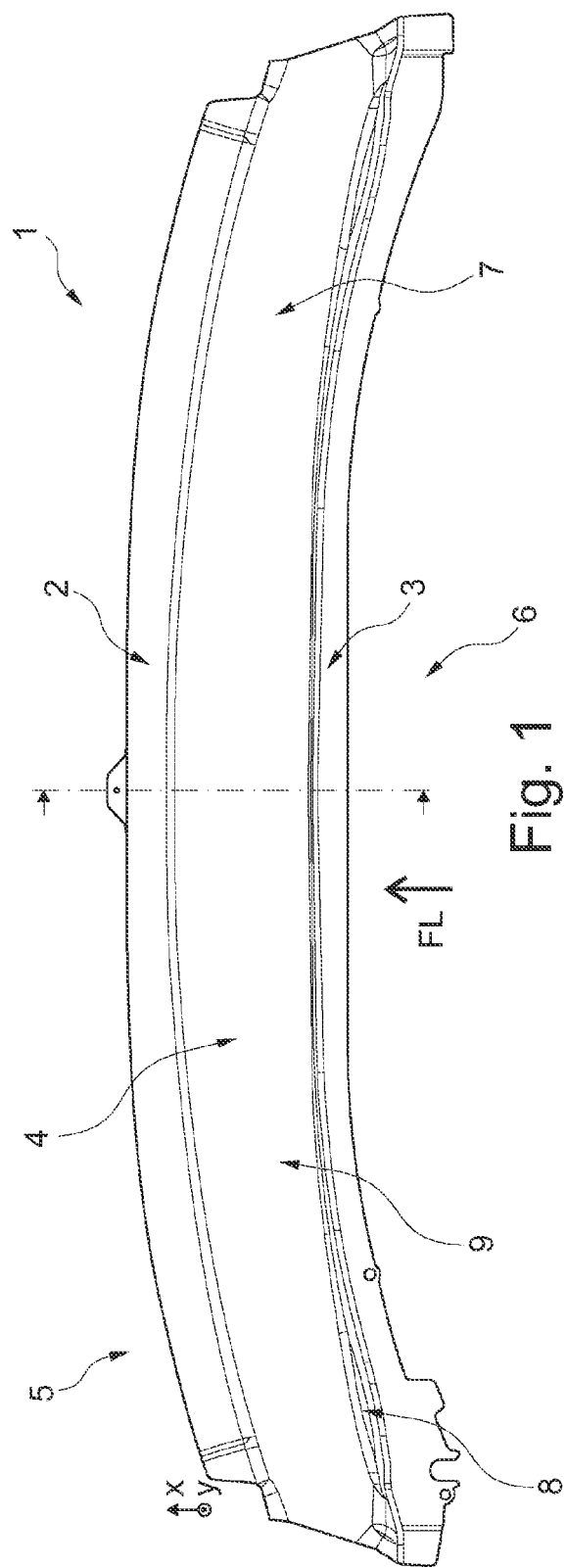
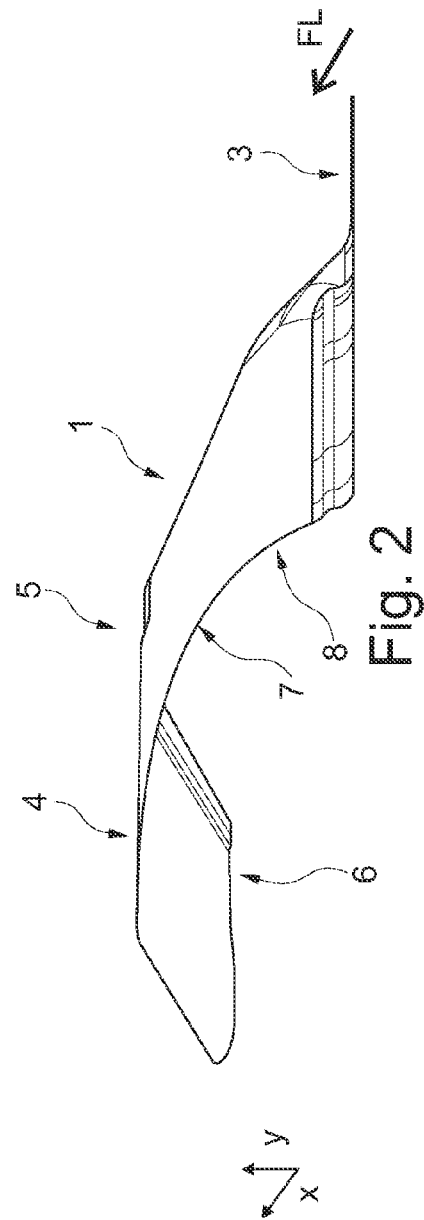
Fig. 1
Fig. 2

BODY STRUCTURE WITH A PANE CROSS MEMBER FOR A MOTOR VEHICLE WITH A WINDSHIELD

CROSS-REFERENCE TO RELATED APPLICATION

This application claims priority to German Patent Application No. 102010023281.5, filed Jun. 10, 2010, which is incorporated herein by reference in its entirety.

TECHNICAL FIELD

The technical field relates to a body structure for a motor vehicle with a windshield, wherein the body structure has a pane cross member, which in particular in the case of a collision with pedestrians deforms with the motor vehicle, in order to absorb the energy brought about by the impact.

BACKGROUND

Most accidents in road traffic concern collisions between a pedestrian or cyclist and a motor vehicle. Whereas protective systems for vehicle occupants, such as in particular belt tensioners and airbags, nowadays constitute close to a series standard for all classes of vehicle and offer an optimum protection for the vehicle occupants, the pedestrians in such a collision are less protected. Thereby, the pedestrian who is on the roadway is mostly caught by a vehicle by its front region and his head hits on the engine hood or on the lower edge of the windshield.

In order to reduce the risk of injury to pedestrians in collision with a vehicle, body front parts of the vehicle can be configured so as to be flexible. The publication DE 10 2006 029 921 A1 discloses a vehicle with a pane cross member, on which the windshield rests and which is constructed with at least one component which is dish-shaped in profile. The dish-shaped component is extended on the edge side with a supporting leg on which the windshield rests. The pane cross member is constructed here with a first half shell and a second half shell and is substantially closed in cross-section. With an application of force from above and/or from the front, caused for example by the impact of a pedestrian, the supporting leg of the pane cross member can deform contrary to the direction of travel and can therefore receive impact energy. EP 1 810 892 A1 discloses a vehicle with a pane cross member which comprises a curved bracket on which a windshield rests and which can deform and therefore receive impact energy on the application of force from above and/or from the front.

At least one object is to provide a body structure for a motor vehicle which is simply constructed, which can reliably absorb energy on the application of force, can be reduced. In addition, other objects, desirable features and characteristics will become apparent from the subsequent summary and detailed description, and the appended claims, taken in conjunction with the accompanying drawings and this background.

SUMMARY

A body structure is indicated for a motor vehicle with a windshield, which comprises a pane cross member onto which the windshield rests. The pane cross member comprises a first and a second edge section in the form of brackets and a central part lying there between, which has a U-shaped cross-section. The first edge section forms a support section for the windshield. The second edge section is arranged behind the first edge section in the longitudinal direction of the motor vehicle and is fastened to a fixed component of the body structure. The central part is constructed such that it has a curved cross-section in the direction towards an engine hood of the motor vehicle and can deform on the application of force from above and/or from the front. Front designates here a position or direction in the viewing direction of the driver onto the windshield. From above, in turn, designates a position or direction proceeding from the roof frame of the body structure.

The pane cross member is therefore constructed in three parts and it comprises a central part which can receive the impact energy, deform and thereby absorb the energy. As the two edge sections of the pane cross member are formed in the manner of a bracket, the central part of the pane cross member can be separated with a sufficient distance from the region on which the windshield rests, and from the region at which the pane cross member is connected to the body structure. This guarantees, inter alia, a longer distance between the pressure point of the force acting on the windshield and the central part of the pane cross member, whereby a sufficient deformation space can be ensured for the central part of the pane cross member. With an application of force from above and/or from the front, the central part of the pane cross member can deform, owing to its curved U-shaped cross-section, in the direction of its opening. A sufficient deformation space is therefore provided for this, without further elements, such as for example bending regions, having to be integrated into the body structure. It is therefore guaranteed that the kinetic energy acting on the pane cross member in particular on impact of a pedestrian can be efficiently and reliably absorbed by deformation of the central part of the pane cross member. As the forces acting in an accident can therefore be reliably absorbed, the risk of injury to pedestrians can be reduced and therefore their safety can be distinctly improved.

In an example embodiment, the pane cross member extends transversely to the longitudinal direction of the vehicle over the entire width of the engine hood of the motor vehicle. This has the advantage that the energy can be absorbed reliably and efficiently from the site of the impact. Furthermore, a pane cross member which extends over the entire width of the engine hood is symmetrical, whereby it visually blends in harmoniously into the engine hood. In addition, such an arrangement of the pane cross member can take place independently of the arrangement of further components, such as for example a wiper arm.

The central part of the pane cross member can have a dish-like cross-section here. Dish-shaped components have the advantage of a high loading capacity conditional to geometry with at the same time a sufficient strength and rigidity. In addition, these can be constructed simply with regard to manufacturing technology. The central part of the pane cross member can also have a cross-section which is curved in the direction towards the windshield. The central part of the pane cross member can thereby be dimensioned in particular to reduce the risk of injury to a pedestrian in the case of a collision so that it can deform for instance in a head impact in the direction of the acting forces, and the impact angle coincides with the angle which the deformation direction of the central part of the pane cross member forms with a horizontal plane. Thereby, the available deformation space can be utilized efficiently and effectively and the deformation behavior of the pane cross member according to the invention can be further improved, whereby the safety and injury risk on collision with a pedestrian is further reduced.

In a further embodiment, the central part of the pane cross member has a deformation section. This guarantees that the energy can be reliably absorbed, because the deformation behavior of the pane cross member according to the invention is further improved and its flexibility in particular in a pedestrian collision is further increased.

The deformation region of the central region of the pane cross member can extend here over the entire width of the engine hood of the motor vehicle. Thereby, the safety can be further increased for an obstacle, in particular for a pedestrian, on collision with the vehicle body, because the central part of the pane cross member can deform independently of the impact site on the engine hood and the impact angle and therefore the energy produced by the impact can be reliably absorbed by deformation.

The central part of the pane cross member can be deformable here on the application of force in the direction away from the windshield of the motor vehicle. Thereby, a sufficient deformation space is ensured for the central part of the pane cross member. The clearance in the region of the windshield is thus also considerably restricted by the arrangement of further components such as a wiper arm.

In addition, a fastening flange for the windshield can be arranged on the support section for the windshield. Thereby, firstly a pressure-tight connection of the windshield to the pane cross member can be guaranteed, and secondly a sufficiently long distance can be guaranteed between the pressure point of the force acting onto the pane and the deformable central part of the pane cross member, whereby the latter can deform more easily, because a sufficient deformation space is ensured.

In an embodiment, the windshield is applied here with adhesive on the support section for the windshield. This guarantees that the windshield can be fitted flush with the outer skin and therefore can be connected in a pressure-tight manner with, at the same time, low costs and a simple manageability.

The second edge section of the pane cross member can be fastened to a bulkhead of the body structure. Thereby, the pane cross member can be held in a stable manner and the spatial conditions in the region of the front wall can be utilized optimally. In addition, the second edge section of the pane cross member can also be fastened to further fixed components of the body structure, such as for instance a main or instrument carrier.

In an embodiment, the second edge section of the pane cross member is welded with the bulkhead of the body structure. Thereby, it is ensured that the pane cross member is securely connected with the bulkhead, can rest axially thereon and therefore the stability of the component is further increased. Thereby, in turn, a vibrating of the pane cross member in normal vehicle operation and acoustic problems connected therewith can be prevented. The second edge section of the pane cross member is preferably spot-welded with the bulkhead. Depending on the material which is used, however, other types of welding can also be used.

A motor vehicle is also indicated which has the body structure described above. A vehicle which has the body structure described above has an impact absorption structure, with the aid of which an obstacle, in particular a pedestrian, can be protected on an impact, if he collides with the vehicle, by the kinetic energy which is brought about by the impact being able to be efficiently and effectively and hence reliably absorbed by deformation of the central part of the pane cross member. A risk of injury to the pedestrian on collision with the motor vehicle can therefore be distinctly reduced.

To sum up, it is to be stated that a body structure is provided for a motor vehicle with a windshield is indicated, which can be simply constructed and by which the energy can be reliably absorbed on an application of force from above and/or from the front. Thus, by the pane cross member constructed in three parts and in particular by the U-shaped cross-section of the central part of the pane cross member, curved in the direction of the engine hood of the motor vehicle, a sufficient deformation space can be guaranteed for the central part of the pane cross member and the latter can therefore be dimensioned so that it can contribute to a considerable reduction in the risk of injury to a pedestrian in the case of a collision. Also, through a dish-like cross-section a high loading capacity conditional to geometry can be guaranteed with, at the same time, a high stability and rigidity of the central part of the pane cross member, and therefore the absorption of the acting external forces can be further improved on an impact.

The deformation behavior of the central part of the pane cross member can be additionally further improved by the latter having a deformation section which extends over the entire width of the engine hood of the vehicle. Therefore, energy acting on an impact can be absorbed efficiently and effectively independently of the impact site and of the impact angle, whereby the risk of injury to a pedestrian on collision with the motor vehicle can be further reduced.

In addition, the central part of the pane cross member can be embodied simply with regard to manufacturing technique with a U-shaped cross-section. As the two edge sections of the pane cross member are constructed in the manner of brackets, the connection of the windshield and the connection of the pane cross member to the body structure can be separated with a sufficient distance from the central region of the pane cross member, whereby a longer distance is produced between the pressure point of a force acting on the pane and the central part of the pane cross member, whereby in turn a sufficient deformation space is ensured for the pane cross member. As the two edge sections of the pane cross member are in addition arranged laterally with respect to each other, the available installation space can be utilized optimally and in so doing the windshield can, at the same time, be connected in a pressure-tight manner. As a sufficient deformation space can be realized without the installation of further elements, such as for example further bending elements, the structure can be kept stable, without further components and hence increased costs being necessary. Consequently, a simple configuration of the pane cross member is produced.

BRIEF DESCRIPTION OF THE DRAWINGS

The present invention will hereinafter be described in conjunction with the following drawing figures, wherein like numerals denote like elements, and:

FIG. 1 shows a top view from above onto a pane cross member according to an embodiment of the invention;

FIG. 2 shows a cross-section of the pane cross member of the embodiment shown in FIG. 1;

DETAILED DESCRIPTION

Figure 3:
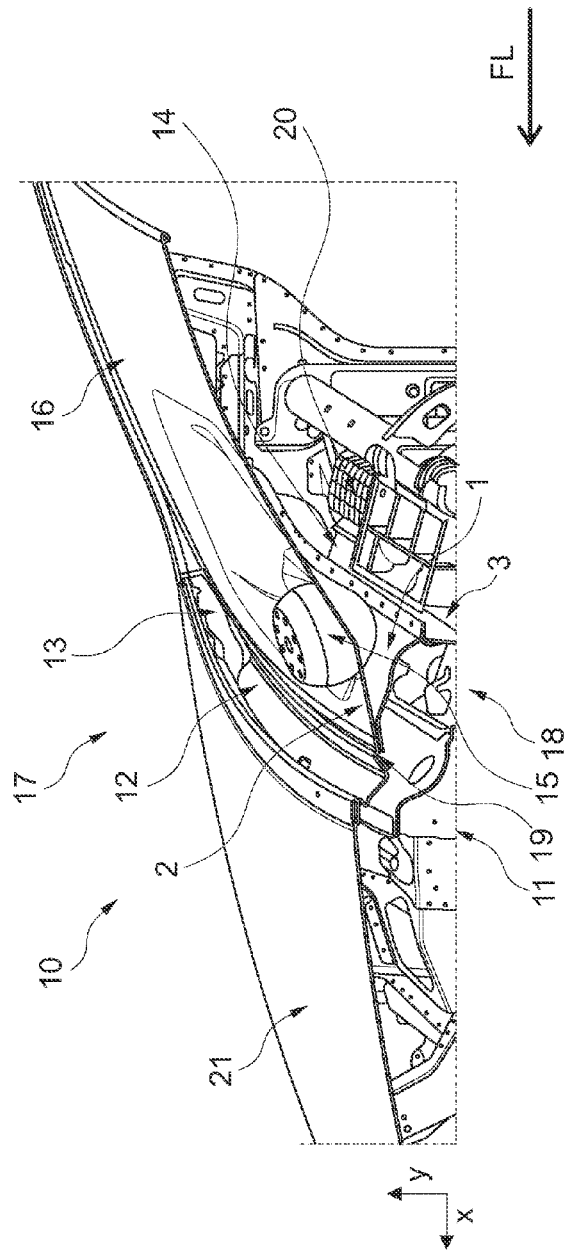
FIG. 3 shows a diagrammatically perspective lateral sectional view onto a motor vehicle with a body structure which comprises a pane cross member according to FIG. 1.

The following detailed description is merely exemplary in nature and is not intended to limit application and uses. Furthermore, there is no intention to be bound by any theory presented in the preceding background or summary or the following detailed description FIG. 1 and FIG. 2 show illustrations of a pane cross member 1 according to the invention in a top view from above (FIG. 1) and in cross-section (FIG. 2). FIG. 1 shows a top view from above onto a pane cross member 1 according to an embodiment.

The arrow marked by reference FL symbolizes here the longitudinal direction of the vehicle. The directions above and in front are represented here, for better illustration, with reference to a coordinate system. With respect to the xy plane, the x axis points here in a direction which is designated as front, and the y axis points in a direction which is designated as above.

As can be seen in FIG. 1, the pane cross member 1 according to the invention is constructed in three parts. Thus, the latter comprises a first edge section 2 and a second edge section 3 in the form of brackets, and a central part 4 lying there between, which has a U-shaped cross-section. The first edge section 2 is constructed here as a support section for a windshield and the second edge section 3 is fastened to a fixed component of the body structure and is arranged in the x direction behind the first edge section 2, when the pane cross member 1 is installed in the vehicle. The central part 4 of the pane cross member 1 can in turn deform on an application of force from above and/or from the front. The arrow marked by reference 5 symbolizes here the force acting on the pane cross member. The arrow marked by reference 6 in turn designates the deformation direction of the central part of the pane cross member.

In addition, FIG. 1 shows a dish-like cross-section of the central part 4 of the pane cross member 1. The pane cross member 1 is formed from a single sheet, so that it is single-walled and not double-walled. This has a base 7, curved in a convex shape, which continues into an edge 8 of the central part 4 of the pane cross member 1. In addition, the central part 4 of the pane cross member 1 has a deformation region 9. In the example embodiment of FIG. 1, this deformation region 9 corresponds to the curved base 7 of the central part 4 of the pane cross member 1.

FIG. 2 shows a cross-section of the pane cross member 1 according to FIG. 1. Components having the same construction or function as in FIG. 1 bear the same reference numbers and are not given extra explanation. As FIG. 2 shows, the central part 4 of the pane cross member 1 has a U-shaped cross-section. When the pane cross member 1 is installed in the vehicle, the open side of the U-shaped cross-section is directed downwards, i.e. in the direction of the roadway. With an application of force from above and/or from the front, i.e., from above and/or from in front of the windshield of the vehicle, the central part 4 can deform. As FIG. 2 shows, the central part 4 of the pane cross member 1 deforms here in the direction of its opening, i.e., into the cross-section.

FIG. 2 also shows the dish-like cross-section of the central part 4 of the pane cross member 1. Thus, a base 7 can be seen which is curved upwards in a convex shape, which continues into an edge 8 of the central part 4 of the pane cross member 1. As can be seen, the central part 4 of the pane cross member 1 can curve in the direction of its opening. The curvature which results corresponds here to the deformation of the central part 4 of the pane cross member 1 on an application of force from above and/or from the front.

Figure 4:
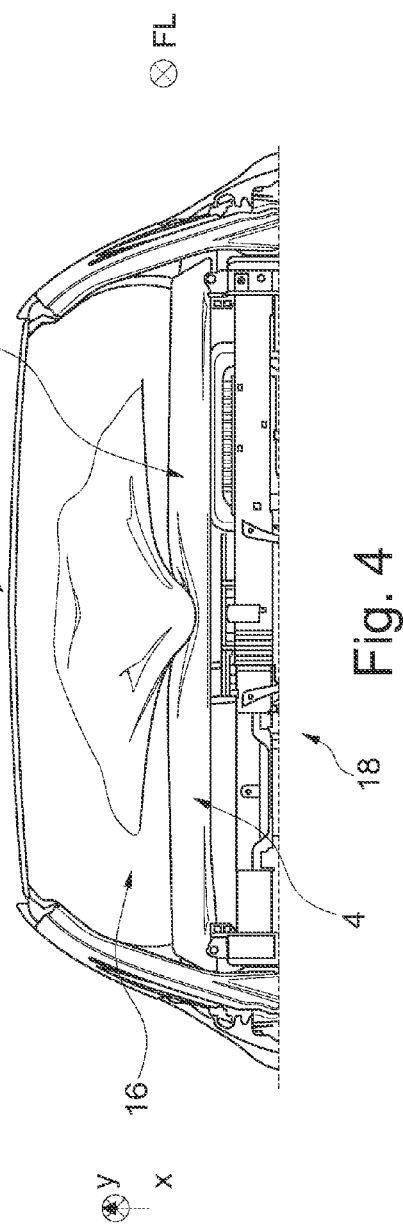
FIG. 4 shows a sectional view from the rear of the motor vehicle shown as a cross-section in FIG. 3.

FIG. 3 and FIG. 4 show in diagrammatically perspective illustrations a motor vehicle 10 with a body structure 11, which comprises a pane cross member 1 according to FIG. 1, in lateral sectional view (FIG. 3) and in sectional view from the rear (FIG. 4). Components with the same function or construction as in FIG. 1 or in FIG. 2 bear the same reference numbers and are not given extra explanation.

FIG. 3 shows a diagrammatically perspective lateral sectional view onto a motor vehicle 10 with a body structure 11, which comprises a pane cross member 1 according to FIG. 1. As FIG. 3 shows, the body structure 11 comprises a pane cross member 1 in accordance with FIG. 1. Again to be seen are a first edge section 2 and second edge section 3, which are constructed in the form of brackets, and a central part 4 lying there between, which has a U-shaped cross-section. As FIG. 3 shows, the first edge section 2 forms a support section here for the windshield 13. The second edge section 3 is fastened to a fixed component 14 of the body structure 11 and is arranged in x direction, i.e., in longitudinal direction of the motor vehicle 10, behind the first edge section 2. In the embodiment which is shown, the fixed component 14 of the body structure 11 is a bulkhead here.

In addition, FIG. 3 shows that the central part 4 of the pane cross member 1 can deform on an application of force from above and/or from the front. According to FIG. 3, in a simulation a pedestrian collision is illustrated with a head impact, indicated by means of a head impactor 15, in the lower edge section of the windshield. With a correspondingly great impact force of the head impactor 15 onto the lower edge of the windshield 16, the central part 4 of the pane cross member 1 can deform and therefore receive impact energy. The arrow provided with reference 17 symbolizes here the impact force of the head impactor 15. The arrow provided with reference 18 in turn symbolizes the direction of the deformation of the central part 4 of the pane cross member 1.

As FIG. 3 further shows, the central part 4 of the pane cross member 1 is curved here in the direction towards the windshield 16. FIG. 3 shows further that with an application of force from above and/or from the front corresponding to a great impact force of the head impactor 15, the central part 4 of the pane cross member 1 is deformable in the direction away from the windshield 16 and can therefore receive impact energy.

In addition, a fastening flange 19 for the windshield 16 can be seen, which is arranged on the support section 13 for the windshield 16. The windshield 16 can be applied here by means of adhesive on the support section 13 for the windshield 16. In addition, a plastic part 12 is shown, which substantially closes the region between the engine hood 21 and the windshield 16.

In the example embodiment shown in FIG. 3, the second edge section 3 of the pane cross member 1 is fastened here on a bulkhead of the body structure 20. In addition, the second edge section 3 of the pane cross member 1 can also be fastened on a further, fixed component of the body structure, such as for instance a main or instrument carrier. Preferably here the second edge section 3 of the pane cross member 1 is welded with the bulkhead of the body structure. Preferably, the second edge section 3 of the pane cross member 1 is spot-welded with the bulkhead 20. Depending on the material which is used, however, other types of welding can also be used.

FIG. 4 shows a diagrammatically perspective sectional view from the rear of the motor vehicle 10 shown in FIG. 3. Components with the same function or construction as in FIG. 3 bear the same reference numbers and are not given extra explanation. As FIG. 4 shows, the pane cross member 1 extends transversely to the longitudinal direction of the vehicle FL over the entire width of an engine hood 21 of the motor vehicle 10. In the example embodiment which is shown, with the pane cross member 1 the deformation region 9 of the pane cross member 1 also extends over the entire width of the engine hood 21 of the motor vehicle 10.

As can be readily seen in FIG. 4, the central part 4 of the pane cross member 1 can deform with an application of force from above and/or from the front in the direction away from the windshield 16. As this extends over the entire width of the engine hood 21 of the motor vehicle 10, the central part 4 of the pane cross member 1 can deform, independently of the impact site and impact angle of an obstacle, particularly of a pedestrian, onto the lower edge section of the windshield 16 of the motor vehicle 10, and can therefore receive impact energy.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body structure for a motor vehicle, comprising:
   a windshield; and
   a pane cross member onto which rest the windshield, the pane cross member comprises:
   a first edge section in bracket form;
   a second edge section in bracket form;
   a central part having a substantially U-shaped cross-section and lying between the first edge section and the second edge section; and
   a deformation space located within a curve of the U-shaped cross-section,
   wherein the first edge section is configured to form a support section for the windshield,
   wherein the second edge section is fastened to a fixed component of the body structure and arranged in a longitudinal direction of the motor vehicle behind the first edge section,
   wherein the central part is constructed with a cross-section that is curved in a direction towards an engine hood of the motor vehicle and configured to deform into the deformation space upon application of force, and
   wherein the pane cross member comprises a single-walled structure.

2. The body structure according to claim 1, wherein the pane cross member extends transversely to the longitudinal direction of the motor vehicle over a substantially entire width of the engine hood of the motor vehicle.

3. The body structure according to claim 1, wherein the central part of the pane cross member comprises a dish-like cross-section.

4. The body structure according to claim 1, wherein the central part of the pane cross member comprises a curved cross-section in the direction towards the windshield.

5. The body structure according to claim 1, wherein the central part of the pane cross member comprises a deformation section.

6. The body structure according to claim 5, wherein the deformation section of the central part of the pane cross member extends over a substantially entire width of the engine hood of the motor vehicle.

7. The body structure according to claim 1, wherein the central part of the pane cross member is configured to deform upon application of force in a second direction away from the windshield.

8. The body structure according to claim 1, wherein the windshield is applied with adhesive on the support section for the windshield.

9. The body structure according to claim 1, wherein the second edge section of the pane cross member is fastened to a bulkhead of the body structure.

10. The body structure according to claim 9, wherein the second edge section of the pane cross member is welded with the bulkhead of the body structure.

11. A motor vehicle, comprising:
    a windshield; and
    a pane cross member onto which rests the windshield, the pane cross member comprises:
    a first edge section in bracket form;
    a second edge section in bracket form;
    a central part having a substantially U-shaped cross-section and lying between the first edge section and the second edge section; and
    a deformation space located within a curve of the U-shaped cross-section,
    wherein the first edge section is configured to form a support section for the windshield,
    wherein the second edge section is fastened to a fixed component of a body structure and arranged in a longitudinal direction of the motor vehicle behind the first edge section,
    wherein the central part is constructed with a cross-section that is curved in a direction towards an engine hood of the motor vehicle and configured to deform into the deformation space upon application of force, and
    wherein the pane cross member comprises a single-walled structure.

12. The motor vehicle according to claim 11, wherein the pane cross member extends transversely to the longitudinal direction of the motor vehicle over a substantially entire width of the engine hood of the motor vehicle.

13. The motor vehicle according to claim 11, wherein the central part of the pane cross member comprises a dish-like cross-section.

14. The motor vehicle according to claim 11, wherein the central part of the pane cross member comprises a curved cross-section in the direction towards the windshield.

15. The motor vehicle according to claim 11, wherein the central part of the pane cross member comprises a deformation section.

16. The motor vehicle according to claim 15, wherein the deformation section of the central part of the pane cross member extends over a substantially entire width of the engine hood of the motor vehicle.

17. The motor vehicle according to claim 11, wherein the central part of the pane cross member is configured to deform upon application of force in a second direction away from the windshield.

18. The motor vehicle according to claim 11, wherein the windshield is applied with adhesive on the support section for the windshield.

19. The body structure according to claim 1, further comprising a fastening flange for the windshield, wherein the fastening flange is arranged on the support section for the windshield.

20. The motor vehicle according to claim 11, further comprising a fastening flange for the windshield, wherein the fastening flange is arranged on the support section for the windshield.

\* \* \* \* \*